Oct. 15, 1957 YOSHIAKI OYAMA 2,809,487
SUGAR CANE HARVESTER
Filed Oct. 21, 1955 6 Sheets-Sheet 3

INVENTOR.
YOSHIAKI OYAMA
BY
McMorrow, Berman & Davidson
ATTORNEYS

Oct. 15, 1957  YOSHIAKI OYAMA  2,809,487
SUGAR CANE HARVESTER
Filed Oct. 21, 1955  6 Sheets-Sheet 5

INVENTOR.
YOSHIAKI OYAMA
BY
McMorrow, Berman & Davidson
ATTORNEYS

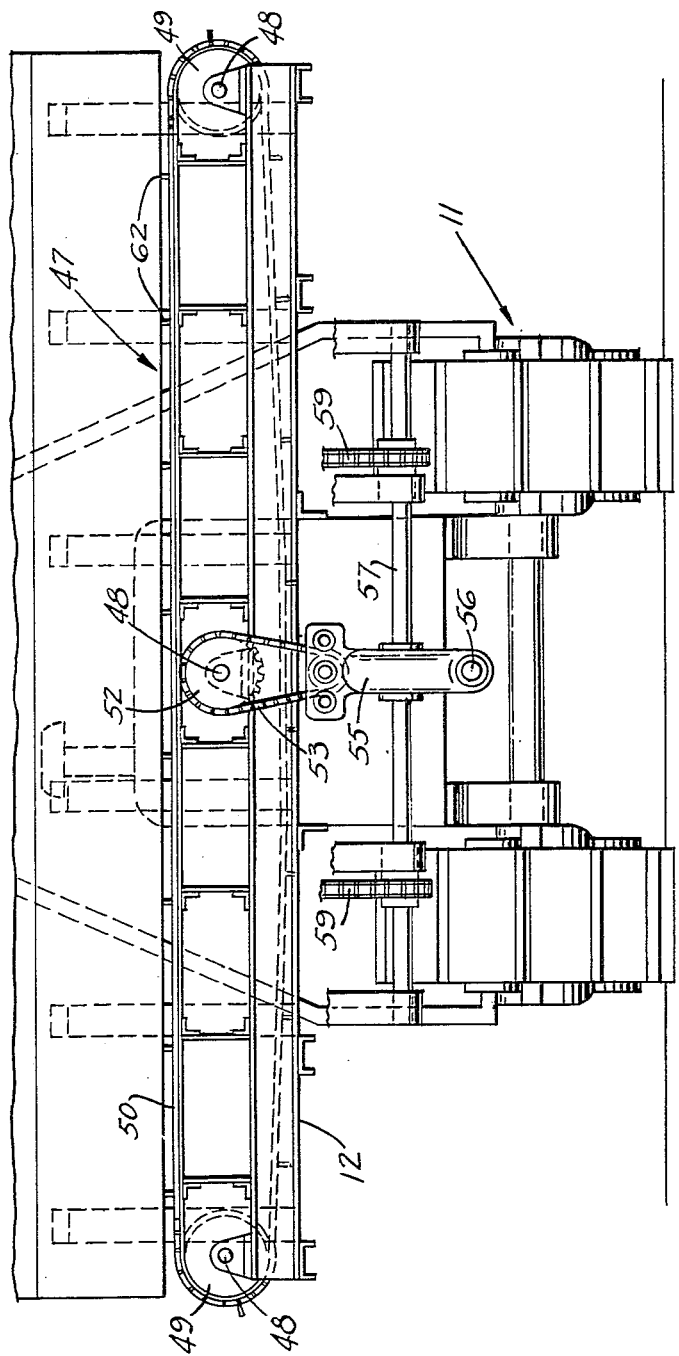

United States Patent Office 2,809,487
Patented Oct. 15, 1957

2,809,487

SUGAR CANE HARVESTER

Yoshiaki Oyama, Wailuku, Territory of Hawaii

Application October 21, 1955, Serial No. 541,949

3 Claims. (Cl. 56—15)

This invention relates to sugar cane harvesting apparatus, and more particularly to an apparatus for harvesting sugar cane of the recumbent or creeping type.

A main object of the invention is to provide a novel and improved apparatus for harvesting recumbent sugar cane, said apparatus being simple in construction, being suitable for operation under a wide variety of conditions of the terrain, being effective on irregular soil having furrows, ridges, ditches and the like, and providing a means for picking up, cutting and collecting sugar cane of the recumbent type in a rapid, efficient, and economical manner.

A further object of the invention is to provide an improved harvesting apparatus for use in harvesting sugar cane of the recumbent type, or for gathering similar material from the ground, the apparatus involving relatively simple and inexpensive components, being durable in construction, being easy to operate, being adjustable to take care of different conditions of use thereof, and providing a great saving in time and labor in the operation of harvesting sugar cane and similar crops of the recumbent type.

A still further object of the invention is to provide an improved apparatus for harvesting recumbent crops, such as recumbent sugar cane. said apparatus being provided with means for simultaneously picking up, elevating, shearing, and conveying the gathered material, which may be loaded directly onto a suitable adjacent transport vehicle, the apparatus scooping cane or similar stalks lying in a scattered condition on the ground forwardly of the apparatus, the apparatus being adapted to traverse an area containing the recumbent material and quickly harvesting said material in an efficient and economical manner.

Further objects and advantages of the invention will become apparent from the following description and claims, and from the accompanying drawings, wherein:

Figure 8 is a cross sectional view taken on the line 8—8 of Figure 4.

Figure 9 is an enlarged side elevational view, partly in vertical cross section of one of the rotary rake members employed at the forward end of the apparatus of Figures 1 to 8.

Figure 10 is a cross sectional detail view taken on the line 10—10 of Figure 9.

Figure 11 is an enlarged cross sectional detail view taken on the line 11—11 of Figure 9.

Figure 1:
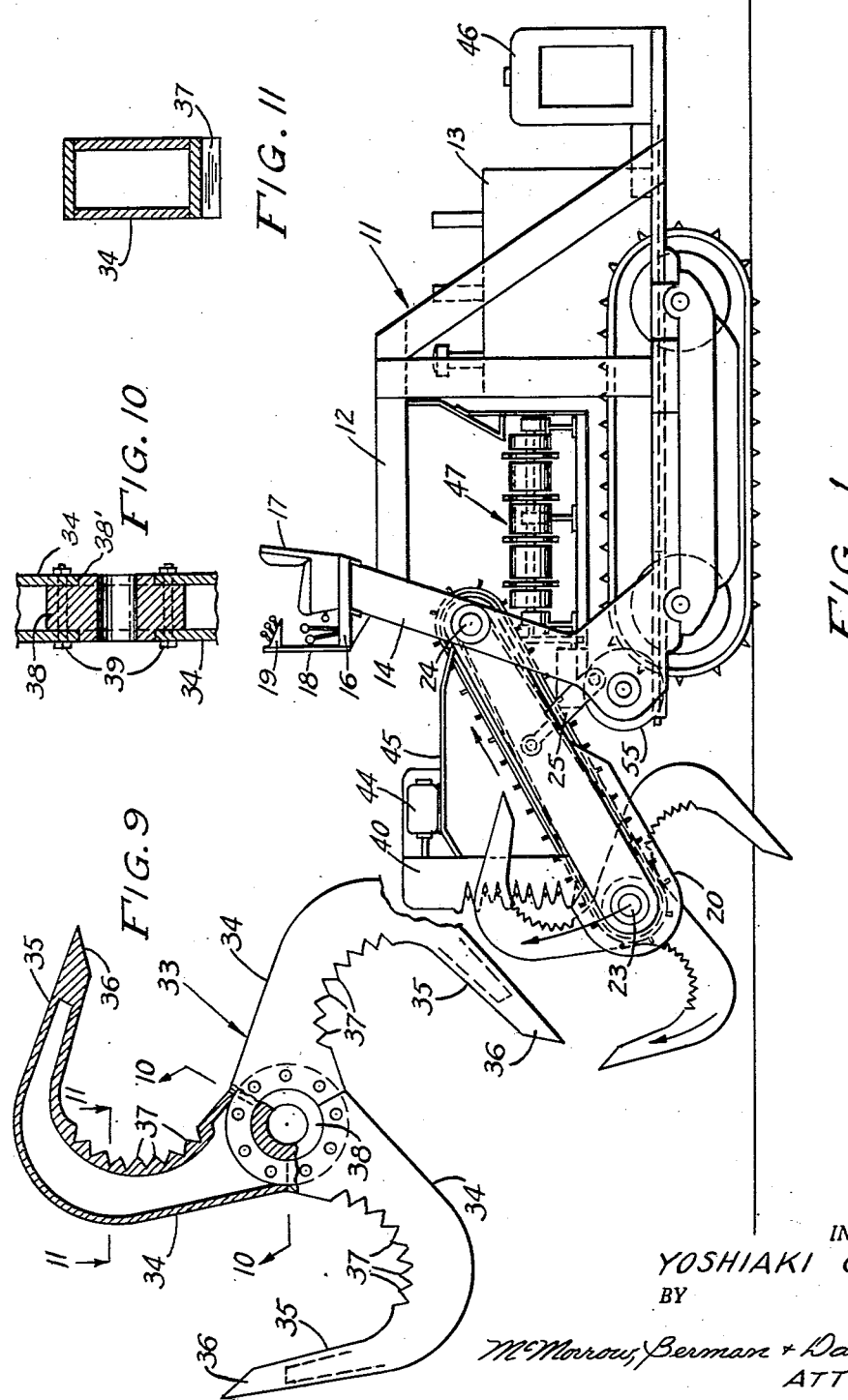
Figure 1 is a side elevational view of an improved apparatus for harvesting recumbent sugar cane constructed in accordance with the present invention.

Referring to the drawings, 11 generally designates an apparatus for harvesting recumbent sugar cane constructed in accordance with the present invention, said apparatus comprising a suitable frame 12 adapted to be mounted on a conventional tractor, for example, a tractor 13 of the crawler type. The frame 12 includes the forward upstanding side members 14, 14, said side members being inclined upwardly and rearwardly, as shown in Figure 1, and being rigidly connected at their top ends by a horizontal transverse beam 15 on the intermediate portion of which is mounted the control platform 16 on which the various controls for the apparatus are located, as well as an operator's seat 17. As shown in Figure 1, the control platform 16 includes the upstanding vertical front wall 18 on which an instrument panel 19 is mounted, said instrument panel carrying various control elements associated with the apparatus.

Figure 5:
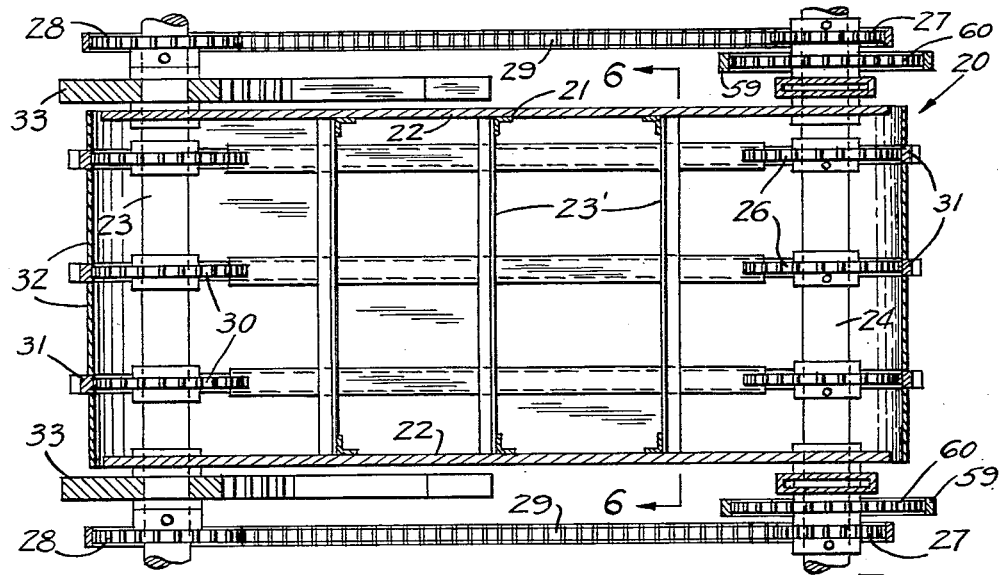
Figure 5 is a cross sectional view taken on the line 5—5 of Figure 4.

A conveyor 20 arranged at an angle to the horizontal is positioned so that the lower end is forwardly of and spaced from the lower ends of the upstanding side members 14 of the frame 12 and the upper end is adjacent the mid-portions of the side members 14. The upper end of the conveyor 20 is connected to the mid-portions of the side members 14 for pivotal movement of said conveyor about a horizontal axis or transverse shaft 24 from the aforesaid position to positions in which the lower end is forwardly of and spaced from the portions of the side members 14 above the lower end thereof. As shown in Figure 5, the conveyor 20 comprises a subframe 21 consisting of longitudinal vertical side plates 22, 22 which are rigidly connected together by a plurality of cross bars 23'. Journaled in the opposite end portions of the longitudinal plates 22, 22, are respective transverse shafts 23 and 24, the opposite ends of the rear transverse shaft 24 extending rotatably through the intermediate portions of the respective upstanding frame members 14, 14, whereby the conveyor 20 is pivoted in the manner above described for rotational adjustment around the axis of the transverse shaft 24.

Figure 2:
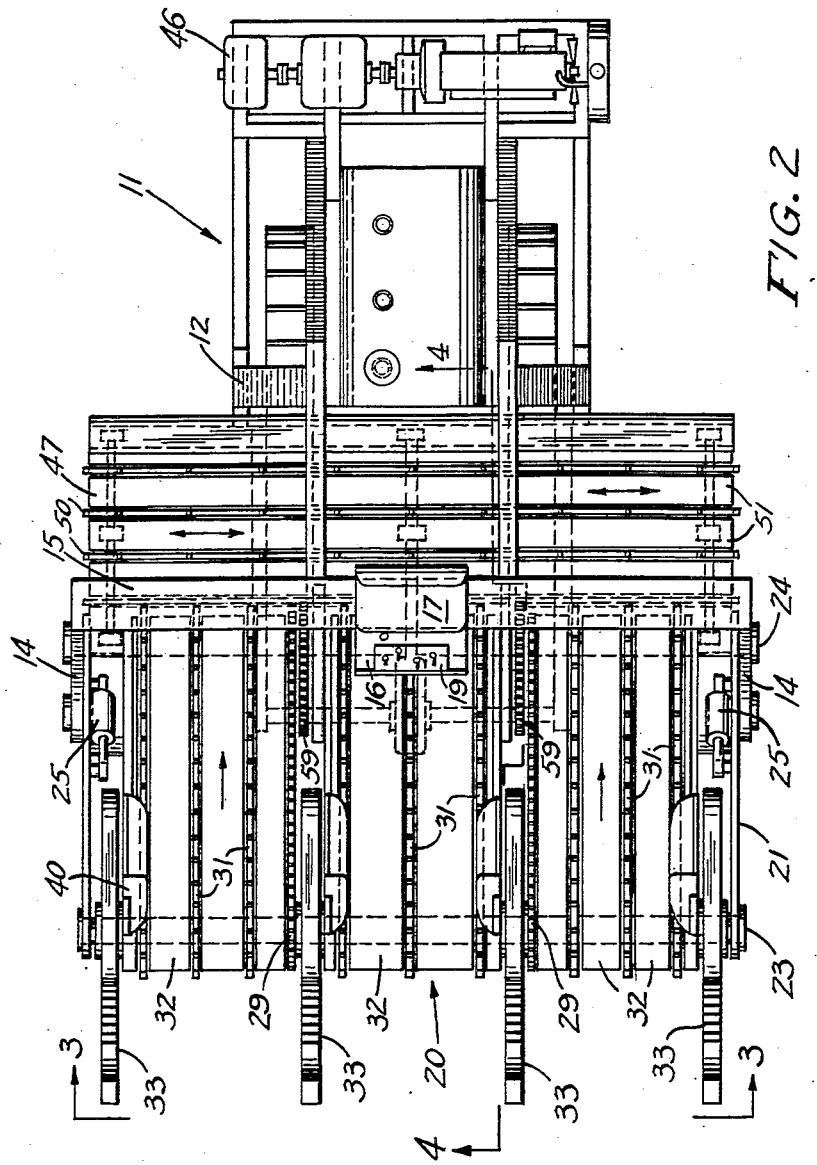
Figure 2 is a top plan view of the apparatus shown in Figure 1.
Figure 3:
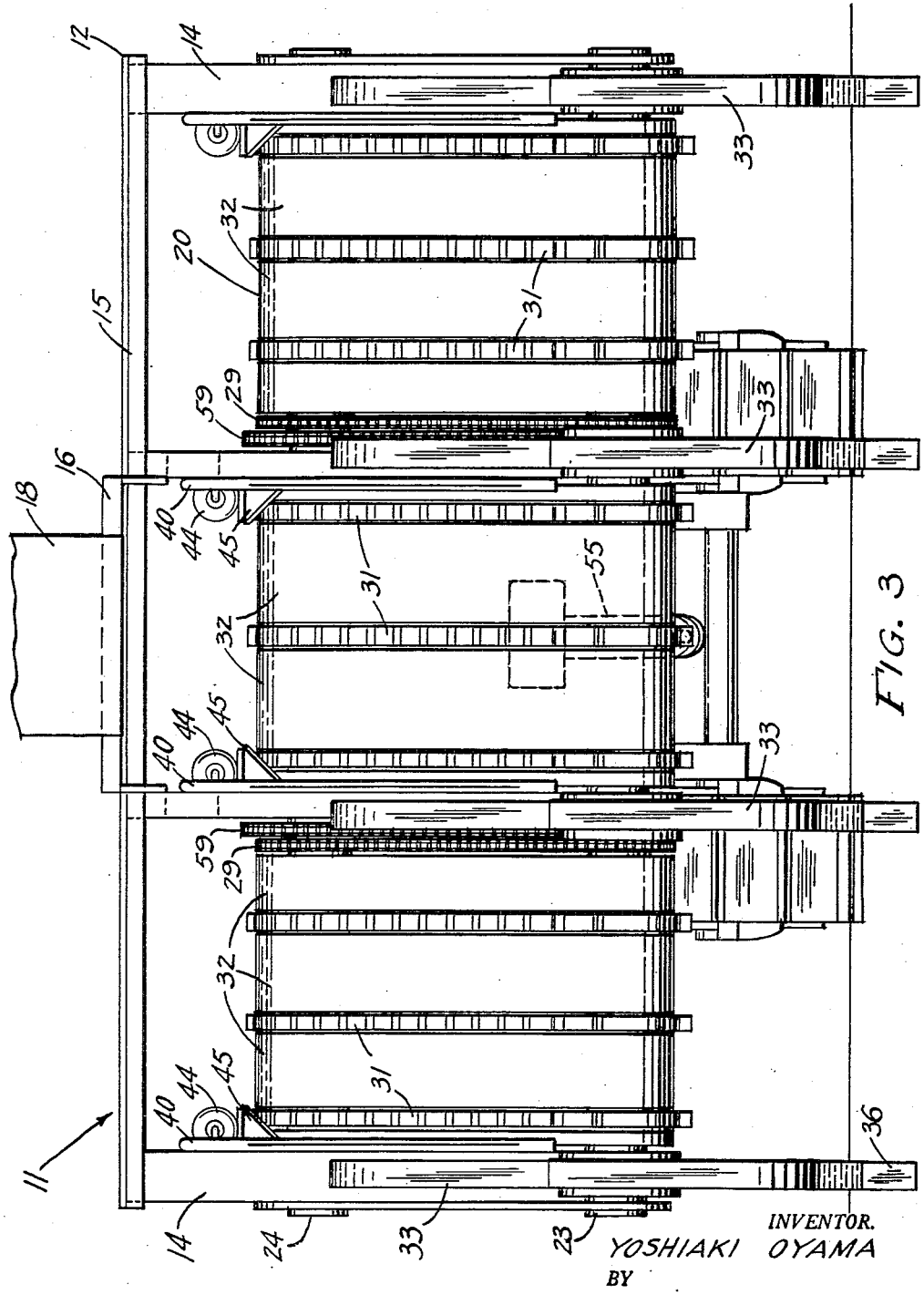
Figure 3 is an enlarged fragmentary front elevational view taken on the line 3—3 of Figure 2.

As shown in Figure 2, the intermediate portions of the respective vertical side plates 22, 22 are connected to the lower forward portions of the upstanding forward frame members 14, 14 by respective fluid pressure-operated jack members 25, 25, said jack members comprising respective cylinders pivotally connected at their ends to the respective frame members 14 and being provided with extensible pistons whose outer ends are pivotally connected to the intermediate portions of the respective side plates 22. The fluid pressure-operated jack members 25, 25 are controlled by the operator by suitable valves provided on the instrument panel 19, the fluid pressure for actuating the members 25, 25 being obtained from the pump system associated with the tractor 13, said system being conventional in construction. The thus described jack members 25 constitute the means for effecting the movement of the conveyor 20.

Secured on the shaft 24 are the spaced conveyor sprocket wheels 26, and also secured on the shaft 24 are the drive sprockets 27, 27 which are coupled to similar drive sprockets 28, 28 secured on the forward shaft 23, as by the sprocket chains 29, 29. Freely rotatable on the forward transverse shaft 23 are the spaced conveyor sprocket wheels 30 aligned with the drive sprockets 26. Interengaged with the respective aligned sprocket wheels 26 and 30 are the sprocket chains 31 of the endless conveyor belt assembly, the intermediate portions between the sprocket chains 31 comprising stationary floor portions 32 past which move the chains 31, said chains 31 being driven by the rear sprockets 26 secured on the drive shaft 24. As will be presently described, the shaft 23 is rotated simultaneously with the sprockets 30 but at a different rate of speed, the shaft 23 being thus independently driven by the sprocket chain 29 and the sprocket wheel 27.

As shown in Figure 2, the conveyor 20 comprises a plurality of sections, for example, three sections spaced along the transverse shafts 23 and 24. The drive chains 29 for rotating the shaft 23 are located between the sections of the conveyor, as shown in Figure 2. Rigidly secured on the shaft 23 at the end portions thereof and between the conveyor sections are respective rotary rake assemblies 33, each rotary rake assembly comprising a plurality of hollow outwardly projecting concavely curved tines 34, said tines being formed at their outer ends with tangentially extending prong portions 35 having the beveled tip elements 36 at their extremities.

As shown in Figure 9, the tines 34 are formed with the transverse serrations 37 at their inside edges for a purpose presently to be described.

As shown in Figure 9, the rotary rake assemblies 33 each comprises a plurality of sections, for example three sections, each section including a concavely curved tine 34, the respective tines 34 being arranged in radial relation about and riveted or otherwise suitably fastened to respective hubs 38 secured on the shaft 23, as shown in Figure 10, to facilitate the assembly of said rotary rake assemblies.

As shown in Figure 11, the respective tines 34 of the rotary rake assemblies are preferably rectangular in transverse cross sectional shape and are provided on their concave edges intermediate the ends with the transverse serrations 37.

As shown in Figure 10, the hubs 38 are annularly shouldered at 38' at their opposite faces and receive the end portions of the tines 34 thereover, the tines being secured to the hub 38 by the transverse bolts or rivets, shown at 39.

As is further apparent from Figure 9, the inside edges of the tines 34 are concave, said concave inside edges being provided with the above described transverse serrations 37.

Figures 6, 7:
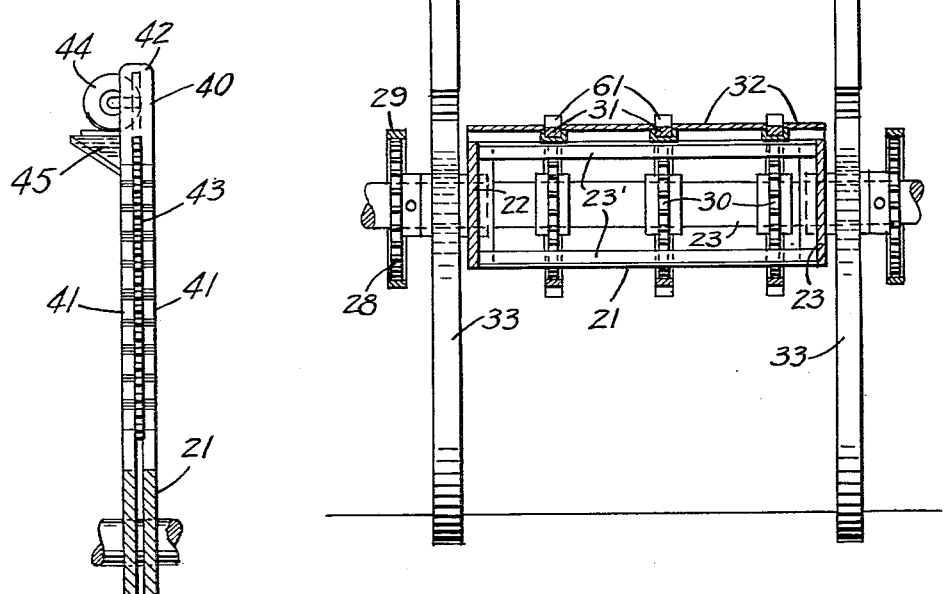
Figure 6 is a transverse vertical cross sectional view taken on the line 6—6 of Figure 5.
Figure 7 is a vertical cross sectional view taken on the line 7—7 of Figure 4, showing a single cutter member only.

Mounted on the subframe 21 inwardly adjacent to and in side by side relation with respect to each rotary rake assembly 33 is an upstanding shearing assembly 40, each assembly being of the type comprising a stationary serrated outer shearing bar and a vertically reciprocating serrated inner shearing bar cooperating with the serrated outer shearing bar. As shown in Figure 7, each shearing assembly 40 thus may comprise a pair of upstanding stationary forwardly serrated outer shearing bars 41, 41 which are integrally connected at their top ends, as shown at 42, and which are spaced apart to define a slot in which is positioned a reciprocating, forwardly serrated shearing bar 43, cooperating with the serrated shearing bars 41, 41 to sever material, such as sugar cane stalks, transversely held thereagainst, responsive to the reciprocation of the inside shearing bar 43. Each shearing bar 43 is reciprocated by a suitable reciprocating mechanism driven by an electric motor 44 secured on suitable bracket means 45 forming part of the subframe 21. The motors 44 are energized from an electric generator 46 provided on the tractor 13.

Designated generally at 47 is a transverse conveyor mounted on the main frame 12 subjacent the rear end portion of the longitudinal conveyor 20, as shown in Figure 1. The transverse conveyor 47 comprises a plurality of longitudinally extending conveyor shafts 48 which are spaced apart and which are suitably journaled on the main frame 12 within the frame 12, the shaft 48 having secured thereon the respective spaced sprocket wheels 49 which are engaged by sprocket chains 50. Between the sprocket chains 50 are the stationary floor elements 51 past which move the sprocket chains 50, defining endless belts extending around the shafts 48 and extending transversely of the frame 12 from one side to the other of said frame. An intermediate shaft 48 has a drive sprocket wheel 52 secured on the forward end thereof, said sprocket wheel 52 being engaged by a sprocket chain 53 which is engaged on a drive sprocket 53' mounted on a drive shaft 54 located below and parallel with the shaft 48 carrying the sprocket 52. Shaft 54 is driven by a gear reducing assembly 55 mounted on the lower forward portion of the main frame 12 and having the input shaft 56 which is connected to the power takeoff shaft of the tractor 13.

The gear reducing assembly 55 is provided with suitable clutch and reversing means of a conventional type for disconnecting and reversing the direction of rotation of the shaft 54 at times, if so desired, whereby the direction of the conveyor 47 may be reversed, enabling material to be unloaded from either side of the apparatus, as desired.

Figure 4:
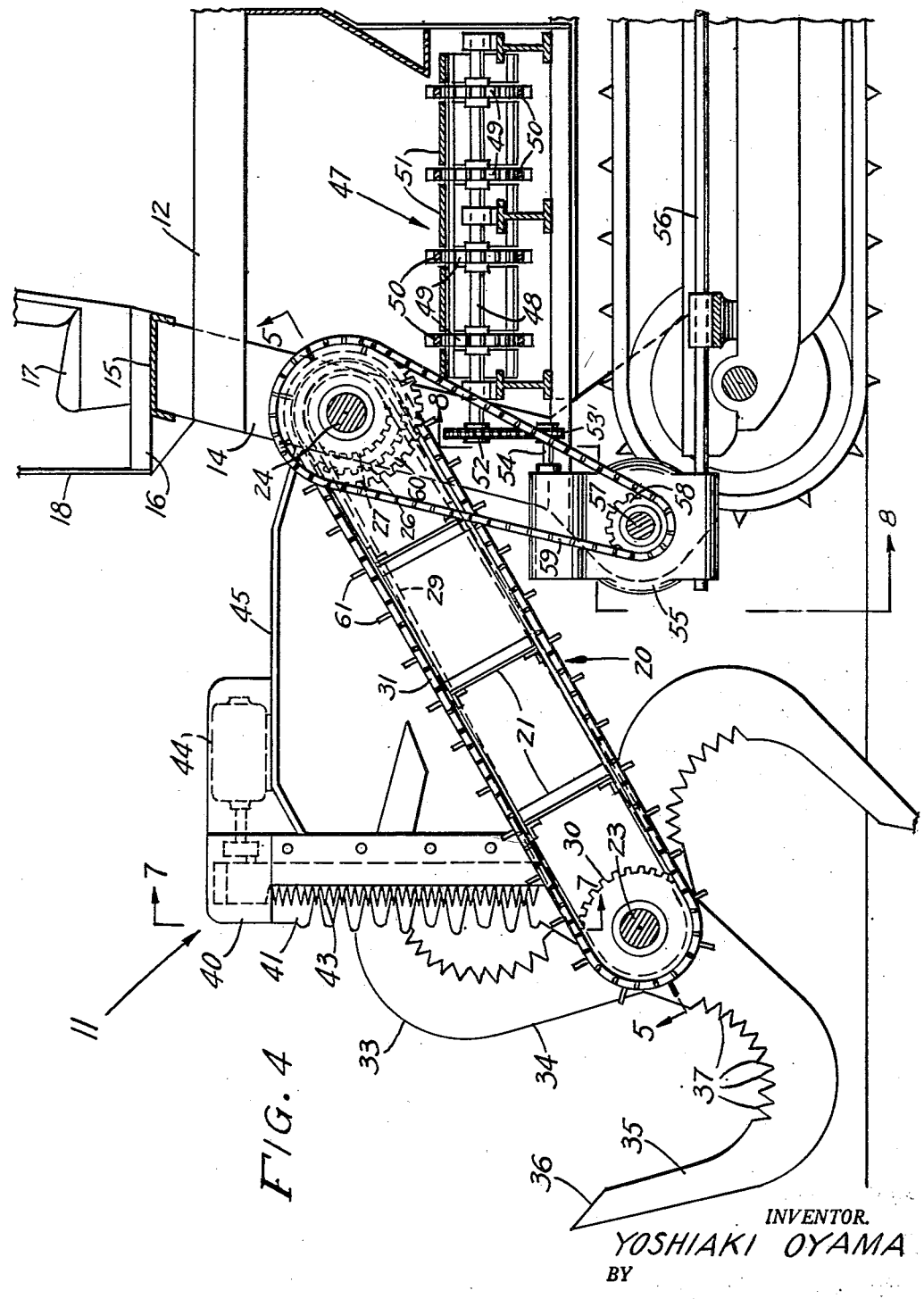
Figure 4 is an enlarged vertical longitudinal cross sectional view taken on the line 4—4 of Figure 2.

The gear reduction assembly 55 is further provided with an output shaft 57 extending transversely, as shown in Figure 4, on which is mounted a sprocket wheel 58. The sprocket wheel 58 is coupled by a sprocket chain 59 to a relatively large sprocket wheel 60 secured on shaft 24, whereby shaft 24 is driven from the power input shaft 56 through the shaft 57, the relatively small sprocket wheel 58, the sprocket chain 59, and the relatively large sprocket wheel 60. The speed reducing assembly 55 is arranged to provide a substantial speed reduction between the input shaft 56 and the output shaft 57, whereby the small sprocket wheel 58 rotates at a relatively slow speed. A further reduction is provided at the shaft 24, since the sprocket wheel 60 is relatively large as compared with the sprocket wheel 58. Since the sprocket wheel 60 drives the shaft 24, and since the shaft 24 drives the rotary rake assemblies 33 directly through the sprocket chains 29 and the sprocket wheels 28 which are rigidly secured on the shaft 23, and since the drive sprockets 26 for the conveyor 20 are larger than the sprockets 27 driving the rotary rake assemblies 33, the conveyor belt elements of conveyor 20 move more rapidly than the tines 34, insuring that material will be carried away on the conveyor 20 faster than it is supplied thereto by the rotating tines 34, as will be presently described.

As shown in Figure 4, the endless belt elements of the conveyor 20 include the outwardly projecting conveyor lugs 61 carried on the sprocket chains 26 and spaced apart by regular distances. Similar outwardly projecting lugs 62 are provided on the sprocket chain elements of the transverse conveyor 47.

In operation of the apparatus, the rotary rake assemblies 33 rotate in a clockwise direction, as viewed in Figure 1, whereby the lowermost tine elements thereof move forwardly, engaging recumbent sugar cane material, or similar material to be harvested, elevating the material and moving it rearwardly so that the material is moved transversely against the shearing assemblies 40. The material is sheared into lengths corresponding to the spacing between the shearing assemblies 40 and is deposited therefrom onto the lower portion of the conveyor 20, the severed material being engaged by the lugs 61 on the respective conveyor segments and being moved upwardly and rearwardly thereby, until finally the severed material is deposited on the transverse conveyor 47, being then moved laterally and being discharged into a suitable transport vehicle located at one side of the apparatus. The serrations 37 act to properly support the cane or similar material so as to prevent said material from becoming too thickly concentrated for efficient shearing by the shearing members 40, the serrations holding the cane properly separated so that a large quantity of cane can be simultaneously sheared without overloading the shearing assemblies. At the same time, the severed material is properly spread so that the material will be evenly deposited on the conveyor 20, insuring a continuous and substantially uniform discharge of material rearwardly onto the transverse conveyor 47, and a similar continuous and uniform discharge of severed cane material from the transverse conveyor 47 into the receiving vehicle.

It will be readily understood that the apparatus may, if so desired, be employed in the manner of a conventional rake, by locking the rotary rake assemblies 33 in a fixed position, whereby the lowermost elements thereof may be arranged to define a rake assembly which acts to pick up material as the apparatus is moved forwardly without providing the additional functions of severing and conveying the material which are obtained when the apparatus is employed in its normal manner.

While a specific embodiment of an improved apparatus for harvesting recumbent sugar cane or similar material has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an apparatus for harvesting recumbent sugar cane and similar material, a frame adapted to be mounted on a vehicle, said frame including a pair of upstanding side members, a conveyor arranged at an angle to the horizontal positioned so that the lower end is forwardly of and spaced from the lower ends of said side members and the upper end is adjacent the mid-portions of said side members, the upper end of said conveyor being connected to the mid-portions of said side members for movement of said conveyor from the aforesaid position to positions in which the lower end is forwardly of and spaced from the portions of said side members above the lower ends thereof, means operatively connected to said conveyor for effecting the movements of the latter, a transversely disposed rotatable shaft carried by the lower end of said conveyor, a plurality of rake assemblies arranged in spaced relation along said shaft and carried by the latter, each rake assembly including a hub carried by said shaft and a plurality of concavely curved tines arranged in radial relation about and secured to said hub, and an upstanding reciprocating shearing assembly arranged in side by side relation with respect to each of said rake assemblies and carried by said conveyor.

2. In an apparatus for harvesting recumbent sugar cane and similar material, a frame adapted to be mounted on a vehicle, said frame including a pair of upstanding side members, a conveyor arranged at an angle to the horizontal positioned so that the lower end is forwardly of and spaced from the lower ends of said side members and the upper end is adjacent the mid-portions of said side members, the upper end of said conveyor being connected to the mid-portions of said side members for pivotal movement of said conveyor about a horizontal axis from the aforesaid position to positions in which the lower end is forwardly of and spaced from the portions of said side members above the lower ends thereof, means operatively connected to said conveyor for effecting the movements of the latter, a transversely disposed rotatable shaft carried by the lower end of said conveyor, a plurality of rake assemblies arranged in spaced relation along said shaft and carried by the latter, each rake assembly including a hub carried by said shaft and a plurality of concavely curved tines arranged in radial relation about and secured to said hub, and an upstanding reciprocating shearing assembly arranged in side by side relation with respect to each of said rake assemblies and carried by said conveyor.

3. In an apparatus for harvesting recumbent sugar cane and similar material, a frame adapted to be mounted on a vehicle, said frame including a pair of upstanding side members, a conveyor arranged at an angle to the horizontal positioned so that the lower end is forwardly of and spaced from the lower ends of said side members and the upper end is adjacent the mid-portions of said side members, the upper end of said conveyor being connected to the mid-portions of said side members for movement of said conveyor from the aforesaid position to positions in which the lower end is forwardly of and spaced from the portions of said side members above the lower ends thereof, means operatively connected to said conveyor for effecting the movements of the latter, a transversely disposed rotatable shaft carried by the lower end of said conveyor, a plurality of rake assemblies arranged in spaced relation along said shaft and carried by the latter, each rake assembly including a hub carried by said shaft and a plurality of concavely curved tines arranged in radial relation about and secured to said hub, each of the tines on each of said assemblies having on the concave edge intermediate the ends thereof a plurality of serrations, and an upstanding reciprocating shearing assembly arranged in side by side relation with respect to each of said rake assemblies and carried by said conveyor.

References Cited in the file of this patent

UNITED STATES PATENTS

| | | |
|---|---|---|
| 2,027,840 | Rodin | Jan. 14, 1936 |
| 2,532,904 | Guild | Dec. 5, 1950 |
| 2,546,165 | Patten | Mar. 27, 1951 |
| 2,547,355 | Young | Apr. 3, 1951 |
| 2,724,228 | Duncan | Nov. 22, 1955 |